Patented Nov. 3, 1931

1,830,153

UNITED STATES PATENT OFFICE

KARL WILKE, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

ORTHO-AMINOALDEHYDES AND ORTHO-AMINOKETONES OF THE ANTHRAQUINONE SERIES AND PROCESS OF PREPARING THEM

No Drawing. Original application filed March 3, 1927, Serial No. 172,555, and in Germany March 8, 1926. Divided and this application filed April 11, 1929. Serial No. 354,439.

My present invention relates to ortho-amino-ketones of the anthraquinone series and to a process of preparing them. More particularly my invention relates to the new compounds of the following general formula:

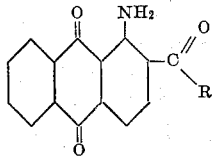

wherein R stands for an alkyl group.

I have found that ortho-aminoaldehydes and ortho-amino-ketones of the anthraquinone series are obtained by treating with a reducing agent as for instance with sodium hydrosulfite or with ferrous sulfate the reaction products which are formed for instance by the action of fuming sulfuric acid upon 1-nitro-2-alkyl anthraquinones at a low temperature and which are insoluble in cold alkalies and distinguished by their great reactivity (see for instance U. S. Patent No. 1,417,875). The products corresponding to the 1-nitro-2-methyl anthraquinones are thus converted into the ortho-amino aldehydes, the products corresponding to the 1-nitro-2-ethyl anthraquinones, however, into the ortho-amino-ketones. This reaction shows that the above-mentioned intermediate products are anthraquinone-isoxazoles and proves the correctness of the supposition as regards their constitution which could hitherto only be deduced from the empiric composition determined by analysis. The manner in which these products are formed does not indicate a priori that they constitute isoxazole derivatives. Nor could it be foreseen whether and how far an isoxazole of the anthraquinone series would have the well known properties of the isoxazoles of other classes of substances.

The preparation of the anthraquinone-isoxazoles may advantageously be combined with the preparation of amino anthraquinone aldehydes and amino anthraquinone ketones so that only a single operation is required in each case.

The following example serves to illustrate my invention, but it is not intended to limit it thereto; the parts are by weight.

Preparation of 1-amino-2-acetyl anthraquinone (1-amino-anthraquinone-2-methyl ketone) having the formula:

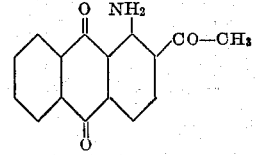

1 part of anthraquinone-1.2-methyl isoxazole (obtainable by causing fuming sulfuric acid to act upon 1-nitro-2-ethyl anthraquinone) is mixed with 2 parts of sodium hydrosulfite in an aqueous ammoniacal solution and the mixture is heated on the water bath, while excluding air, until the mass is dissolved. By subsequently introducing air into the filtered solution the 1-amino-2-acetyl anthraquinone is obtained, which, when recrystallized from glacial acetic acid, forms coarse red needles melting at 220° C. It dissolves in an ammoniacal hydrosulfite solution to a reddish-yellow, in a caustic alkaline solution to a brown solution.

This is a division of my co-pending application Serial No. 172,555 filed on March 3, 1927.

I claim:

1. The process which comprises subjecting an anthraquinone-1.2-alkyl-isoxazole compound to the action of a reducing agent.

2. The process which comprises reducing an anthraquinone-1.2-alkyl-isoxazole compound with ferrous sulfate.

3. The process which comprises subjecting anthraquinone-1.2-methyl-isoxazole to the action of a reducing agent.

4. The process which comprises reducing anthraquinone-1.2-methyl-isoxazole with ferrous sulfate.

5. As new products, compounds of the following formula:

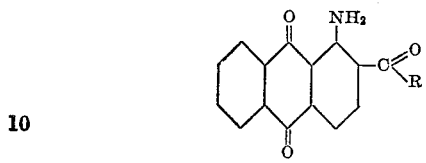

wherein R stands for an alkyl group.

6. As a new product, 1-amino-2-acetyl anthraquinone crystallizing from glacial acetic acid in the form of coarse red needles melting at 220° C. and dissolving in an ammoniacal hydrosulfite solution to a reddish-yellow, in a caustic alkaline solution to a brown solution.

In testimony whereof, I affix my signature.

KARL WILKE.